Patented May 29, 1928. 1,671,768

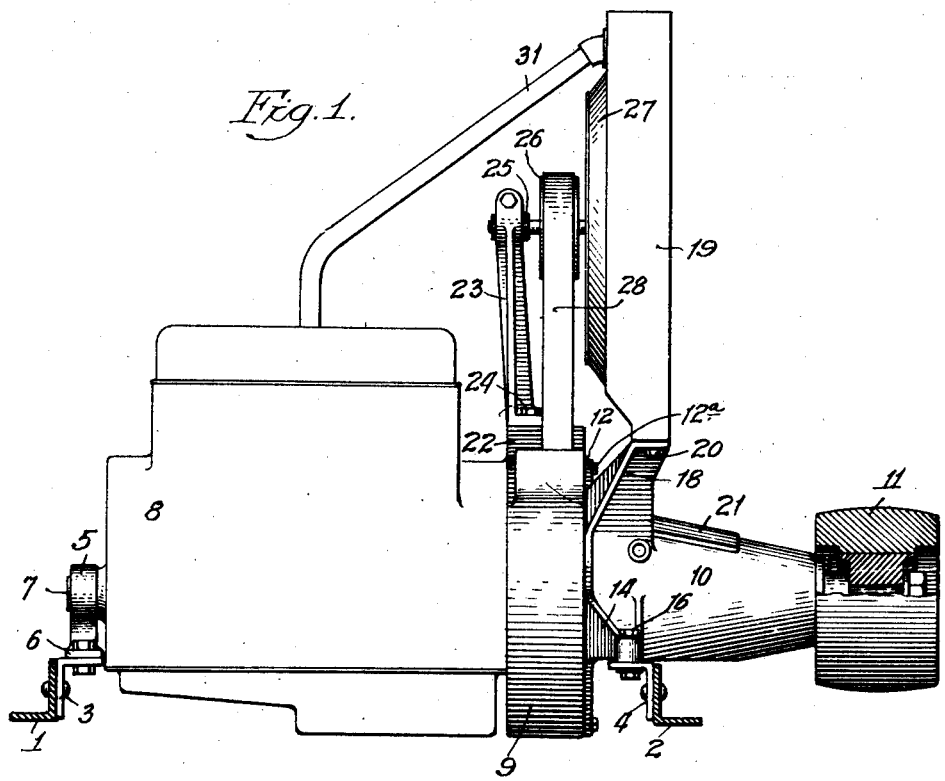
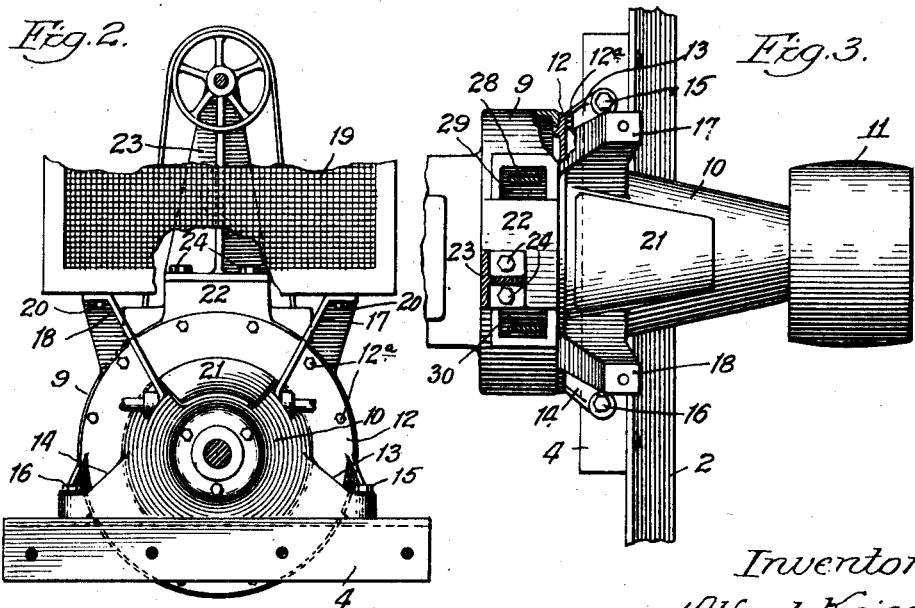

UNITED STATES PATENT OFFICE.

ALFRED KRIEG, OF BATTLE CREEK, MICHIGAN, ASSIGNOR TO NICHOLS & SHEPARD COMPANY, OF BATTLE CREEK, MICHIGAN, A CORPORATION OF MICHIGAN.

POWER-PLANT MOUNTING.

Application filed March 3, 1926. Serial No. 92,094.

The present invention relates to power plant mountings or supporting means, such as that used in agricultural machines, such as combined harvesters.

Among the objects of the invention is to provide a novel mounting or supporting means for a power plant, such as an internal combustion engine, and preferably one on a main frame of a combined harvester. In the present invention the mounting preferably comprises means or members engaging or secured to the main frame, such as the spaced members thereof, and with the engine located between such frame members and carried or supported by said mounting means or members.

Another object of the invention is to provide a mounting or support comprising a housing or hollow means adapted to house power transmittting means, such as a clutch and pulley attachment, and for securement to a supporting means, such as frame members and being rigid with, as at one end thereof, the power plant or engine block. The housing may have projections for effecting such securement to the frame and may also have projections for supporting or mounting thereon a radiator or a fan device, or both. Whether or not such means constitutes the sole support, the engine may have means, as at the other end thereof, preferably in the form of an integral pivot and an engaging member, the latter being secured to the frame, such as a member thereof.

Other objects, features, capabilities and advantages are comprehended by the invention as will later appear and are inherently possessed thereby.

Referring to the drawings, Fig. 1 is a view in side elevation and with parts in section, of a power plant and a mounting constructed in accordance with the invention.

Fig. 2 is an end view, partly broken away, of the same.

And, Fig. 3 is a top plan view partly in section of the same.

Referring now more in detail to the drawings, the embodiment selected to illustrate the invention is shown as comprising spaced main frame side members 1 and 2 of a combined harvester or the like, to which may be secured, in any suitable manner, as by bolting, riveting or the like, supporting members or brackets 3 and 4, which may be of angular shape, as shown in Fig. 1 of the drawings. Upon the bracket 3 may be located an apertured bracket or supporting element 5 having apertured feet 6 through which extend securing elements, such as bolts or the like, such elements also passing through suitable apertures in the bracket element or member 3. The member 5 is apertured to receive a pivot 7 forming an integral or rigid part of the engine block 8 and preferably at one end thereof.

At the other end of the engine block is rigidly attached or secured a fly wheel housing 9 adapted to house a fly wheel and a clutch, and to this housing 9 is secured an extension 10 adapted to house a shaft and carry an outbored bearing therefor, the shaft extending through said bearing and beyond the outer end of the extension to carry suitable power operating means such as a pulley 11 over which a belt may run. The housing 9 and extension 10 are preferably secured together by way of flange portions and bolts 12 as clearly shown in Fig. 1 of the drawings.

The extension 10 is shown as being provided with preferably integral projections or lugs 13 and 14 apertured for receiving securing bolts 15 and 16 passing through suitable apertures in the member 4. The apertures in the members 3 and 4 preferably are elongated to permit a certain amount of adjustment longitudinally of the bracket members 3 and 4, when making a set-up of the device, and also for the tightening of the main drive belt driven by the pulley 11.

At the upper part of the extension 10 is also provided a pair of upwardly projecting and integral supporting elements 17 and 18 upon which may be mounted or supported a radiator 19, the latter being secured to the supporting members 17 and 18 by means of bolts 20 or other suitable securing elements. The housing may also have a cover 21 acting as a closure member therefor and when open, for giving access to the interior of the extension.

The fly wheel housing 9 has an upper seat or saddle 22 upon which is mounted a bracket 23 suitably secured to the seat by bolts 24 and carrying at the upper end thereof a suitable bearing 25 for supporting a shaft and fan pulley 26, a fan being carried by the forward end of the shaft and operating in a space within the flared portion 27 of the radiator casing. The fan pulley may be operated by a belt 28 passing through suitable openings 29 and 30 in the upper part of the fly wheel housing 9 and into the interior thereof, as passing over the fly wheel periphery. A circulation pipe or conduit 31 may be connected with the radiator 19 and the engine 8.

From the above description it will be apparent that the supporting means or mounting is supported by and secured to the members of the main frame and with the engine between the parts of the supporting means and between the frame side bars 1 and 2. In this way the engine may be supported wholly or in part by the extension 10 or by the same in connection with the pivot and bracket at the other end of the engine. This provides for a substantially unitary and rigid means for supporting the power unit and co-operating parts as well as housing and protecting the parts for transmitting power from the engine to the parts to be operated.

While I have herein described and upon the drawings shown an illustrative embodiment of the invention, it is to be understood that the invention is not limited thereto but comprehends other constructions, details, features and arrangements of parts without departing from the spirit thereof.

Having thus disclosed the invention, I claim:

In a power plant comprising an engine block having a lug rigid at one end thereof, a supporting member engaging said lug and adapted to be secured to a frame member, a housing rigid with the other end of said block, an extension rigidly secured to said housing and having lugs adapted to be secured to another frame member, said extension having means for mounting a radiator, and said housing having means for supporting a fan device thereon.

In witness whereof, I hereunto subscribe my name to this specification.

ALFRED KRIEG.